(12) United States Patent
Baker et al.

(10) Patent No.: US 6,282,698 B1
(45) Date of Patent: Aug. 28, 2001

(54) DETECTING SIMILARITIES IN JAVA SOURCES FROM BYTECODES

(75) Inventors: Brenda Sue Baker, Berkeley Heights, NJ (US); Udi Manber, Tucson, AZ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/205,813

(22) Filed: Dec. 4, 1998

Related U.S. Application Data
(60) Provisional application No. 60/074,007, filed on Feb. 9, 1998.

(51) Int. Cl.[7] .................................................. G06F 9/45
(52) U.S. Cl. .................................................. 717/1; 717/11
(58) Field of Search ........................................... 717/1, 11

(56) References Cited

U.S. PATENT DOCUMENTS

| | | | |
|---|---|---|---|
| 5,511,159 | 4/1996 | Baker ................................... | 395/161 |
| 5,627,748 | 5/1997 | Baker ................................... | 395/792 |
| 5,778,231 | * 7/1998 | Van Hoff et al. .................... | 395/705 |
| 5,953,006 | * 9/1999 | Baker et al. .......................... | 345/326 |

OTHER PUBLICATIONS

U. Manber, "Finding Similar Files In a Large File System", *Proc. 1994 Winter Usenix Technical Conference*, Jan. 1994, pp. 1–10.

B. S. Baker, "Parameterized Pattern Matching: Algorithms and Applications," *J. Comput. Syst. Sci.* 52(1), Feb. 1996, pp. 28–42.

B. S. Baker, "Parameterized Duplication In Strings: Algorithms and an Application to Software Maintenance," *SIAM J. Computing*, 26(5), Oct. 1997, pp. 1343–1362.

E. W. Myers, "An O(ND) Difference Algorithm and Its Variations," *Algorithmica*, 1986, pp. 1:251–266.

B. S. Baker, "On Finding Duplication and Near–duplication in Large Software Systems," *Second Working Conference on Reverse Engineering*,1995, pp. 86–95.

H.L. Berghel and D.L. Sallach, "Measurements of Program Similarity in Identical Task Environments," *SIGPLAN Notices*, 9(8), Aug. 1984, pp. 65–76.

S. Brin, J. Davis, and H. Garcia–Molina, "Copy Detection Mechanisms For Digital Documents," *Proceedings of the ACM Special Interest Group on Management of Data (SIGMOD)*, 1995, pp. 1–21.

A. Broder, S. Glassman, M. Manasse, and G. Zweig, "Syntactic Clustering of the Web," *Proceedings of the Sixth International World Wide Web Conference*, Apr. 1997, pp. 391–404.

K.W. Church and J. I. Helfman, "Dotplot: A Program For Exploring Self–similarity In Millions of Lines of Text and Code," *Journal of Computational and Graphical Statistics*, 2(2), Jun. 1993, pp. 153–174.

N. Heintz, "Scalable Document Fingerprinting," *Proceedings of the Second USENIX Workshop on Electronic Commerce*, Nov. 18–21, 1996, pp. 1–10.

(List continued on next page.)

*Primary Examiner*—Kakali Chaki
*Assistant Examiner*—Wei Zhen
(74) *Attorney, Agent, or Firm*—D. P. Dinella

(57) ABSTRACT

A technique for detecting similarities in large sets of binary code files, e.g., bytecode files, without requiring access or knowledge of the actual source code itself. In accordance with the technique, bytecode files are disassembled and preprocessed using positional encoding to prepare the disassembled bytecode files for use in conjunction with similarity detection tools.

15 Claims, 3 Drawing Sheets

OTHER PUBLICATIONS

S. Horwitz, "Identifying the Semantic and Textural Differences Between Two Versions of a Program," *Proceedings of the ACM SIGPLAN Conference on Programming Language Design and Implementation* (PLDI), Jun. 1990, pp. 234–245.

H.T. Jankowitz, "Detecting Plagiarism in Student PASCAL Programs," *Computer Journal*, 31(1),1988, pp. 1–8.

J. H. Johnson, "Substring Matching For Clone Detection and Change Tracking," *Proc. International Conf. on Software Maintenance*, 1994, pp. 1–7.

PocketSoft. .RTPatch Professional, Feb. 23, 1998 http://www.pocketsoft.com/products.html, pp. 1–4.

T. Proebsting and S. A. Watterson, Krakatoa: Decompilation in Java (does bytecode reveal source:). *USENIX Conference on Object–oriented Technologies and Systems*, Jun. 1997, pp. 1–13.

N. Shivakumar and H. Garcia–Molina, "Building a Scalable and Accurate Copy Detection Mechanism," *Proceedings of 1st ACM International Conference on Digital Libraries* (DL'96), Mar. 1996, pp. 1–9.

T. Yan and H. Garcia–Molina, "Duplicate Detection In Information Dissemination," VLDB Conference, Zurich, Sep. 1995, pp.66–77.

* cited by examiner

DISASSEMBLED BYTECODE

DISASSEMBLED BYTECODE AFTER CALCULATING OFFSETS

FIG. 4

| PROGRAM | RANGE OF SOURCE SIMILARITY PERCENT | NUMBER OF TRIALS | AVERAGE SOURCE SIMILARITY PERCENT | AVERAGE BYTECODE SIMILARITY PERCENT | MAX DIFFERENCE PERCENT |
|---|---|---|---|---|---|
| PROGRAM 1 | 90-100<br>80-89<br>70-79 | 59<br>76<br>35 | 93.2<br>84.4<br>75.9 | 88.7<br>78.7<br>71.9 | 9<br>9<br>7 |
| PROGRAM 2 | 90-100<br>80-89<br>70-79 | 17<br>25<br>6 | 92.9<br>83.4<br>76.2 | 91<br>80.2<br>74.2 | 9<br>8<br>5 |

FIG. 5

|  | Siff only | both | Dup only |
|---|---|---|---|
| ordered pairs | 552 | 82 | 10 |
| ordered pairs, different collections | 225 | 18 | 2 |
| unordered pairs, different collections | 23 | 9 | 1 |

SIMILARITIES REPORTED BY SIFF AND DUP FOR 2056 BYTECODE FILES

FIG. 6

| pair | Diff-size/total-lines as % | | | ave. ident. block size in lines | | sum of file sizes in lines |
|---|---|---|---|---|---|---|
| | Java | Offset | No Offset | Offset | No Offset | |
| 1 | 13 | 6 | 57 | 185 | 3 | 2740 |
| 2 | 14 | 17 | 68 | 18 | 2 | 1040 |
| 3 | 30 | 24 | 61 | 8 | 2 | 2098 |
| 4 | 14 | 14 | 21 | 173 | 20 | 1603 |
| 5 | 59 | 40 | 42 | 10 | 10 | 988 |
| 6 | – | 2 | 34 | 198 | 5 | 6041 |
| 7 | 19 | 13 | 32 | 22 | 6 | 8789 |
| 8 | 23 | 24 | 59 | 36 | 12 | 941 |
| 9 | 14 | 8 | 45 | 61 | 4 | 265 |
| 10 | 24 | 32 | 31 | 7 | 8 | 662 |
| 11 | 50 | 55 | 56 | 7 | 24 | 428 |
| 12 | 18 | 41 | 67 | 6 | 2 | 1037 |

DETECTING SIMILARITIES IN JAVA SOURCES FROM BYTECODES

CROSS REFERENCE TO PROVISIONAL APPLICATION

This application claims the benefit of U.S. Provisional Application No. 60/074,007, filed on Feb. 9, 1998.

FIELD OF THE INVENTION

The present invention relates to computer programming and, more particularly, to detecting similarities between computer programs.

BACKGROUND OF THE INVENTION

It is well-known that in the maintenance of large computer programs it is not uncommon for multiple versions of the programs to be created. For example, multiple versions of a particular program may be created to incorporate new features, bug fixes or related versions of the same program having different feature sets. The detection and identification of these multiple versions of programs is a critical issue for system administrators, programmers, system developers and the like, who use, modify and maintain these programs.

There are a number of known techniques for detecting similarities in text files, e.g., source code files, to assist in the determination of changes contained in such files. For example, Udi Manber, Finding Similar Files in A Large File System, In *Proc.* 1994 *Winter Usenix Technical Conference*, pp. 1–10, January 1994, which is hereby incorporated by reference for all purposes, describes the so-called "Siff" tool which analyzes large numbers of files to find similar files based on common "fingerprints" corresponding to sequences of characters. Still further, Brenda S. Baker, Parameterized Pattern Matching: Algorithms and Applications, *J. Comput. Syst. Sci.*, 52(1):28–42, February 1996, which is hereby incorporated by reference for all purposes, describes the so-called "Dup" tool which searches sets of source files for so-called "almost-matching" sections of code for software systems having source code sizes as large as millions of lines. Dup's notion of almost-matching is a parameterized match ("p-match") such that two sections of codes are a p-match if they are the same textually except for possibly a systematic change of variable names. Dup is useful for a variety of applications involving the detection of similarities such as identifying undesirable duplication within a large software system, detecting plagiarism between computer systems, and analyzing the divergence of two systems having a common origin. In addition, the well-known UNIX utility "Diff" (see, e.g., Brian W. Kernighan et al. The UNIX Programming Environment, Prentice-Hall, Englewood Cliffs, N.J., 1984) uses dynamic programming to identify line-by-line changes from one file to another, and is useful for the detailed comparison of two files and for automated distribution of patches.

The above-described techniques, as well as others readily known in the art, detect similarities of programs using source code files embodying the program. Thus, for applications where the source code files are available such techniques prove quite useful. However, in applications where the source code files are not available, e.g., binary code, these techniques are not as useful in detecting similarities between such binary programs. For example, in certain applications a single primary change to a source file, e.g., the insertion of a line of code, may result in many secondary changes to the compiled binary executable file as compared to the compiled binary executable file for the original, i.e., unaltered, source file. The secondary changes could include, e.g., changes to tables that are frequently referenced, changes to pointers, or changes in the encoding of jump instructions that jump across the newly inserted code. Therefore, two programs that have almost identical source code and functionality may have vastly different forms in their binary executable files. As such, source-based techniques which look for common sequences of bytes will not be very efficient in detecting similarities in such disparate binary files.

In particular, the emerging use of so-called Java™ bytecodes, particularly in the form of applets, for executing programs via the World Wide Web is one area where source code similarity techniques are not useful. As is well-known, Java is a popular programming language which enables users to create applications that can be used and executed across the Internet without concerns about platform compatibility or network security. That is, Java is a platform-neutral language which means that programs developed using Java can execute on any computer system without the need for any modifcations. Such platform independence stems from the use of a special format for compiled Java programs called "bytecodes" which are a set of instructions which look similar to conventional machine code, but are not specific to any one processor. Thus, Java bytecode can be read and executed by any computer system that has a Java interpreter.

This is in contrast to compilers for non-Java programming languages, e.g., the well-known C programming language, which translate source programs into machine code or processor instructions which are specific to the processor or computer system. In such non-Java systems, if one wants to use the same program on another computer system, the source program must found and provided as input to the compiler for the different system for recompilation. Thereafter, the recompiled program can be executed on the different computer system. In contrast, to execute a Java program Java bytecodes are generated by a Java compiler which are executed by a Java interpreter, i.e., a bytecode interpreter, which in turn executes the Java program. Thus, placing the Java program in bytecode form enables the execution of such programs across any platform operating system, or windowing system so long as the Java interpreter is available.

The capability of having a single binary file, i.e., Java bytecode file, executable across multiple platforms is a key attribute which is making Java bytecode, particularly in the form of applets, a common way of executing programs across the World Wide Web (which as is well-known is also platform-independent.) In the near term, it is projected that various types of hardware devices, e.g., stand-alone computers, network computers, information appliances, home appliances and the like, will be controlled using Java bytecode programs which will be transmitted to such hardware devices across the Internet and World Wide Web. As will be appreciated, the need to control such bytecode programs in terms of areas such as security, update management, portability, handling preferences, deletions, and so on, will prove critical as such programs are exchanged among users.

As discussed above, while known detection techniques are effective in comparing source code programs these prior art solutions necessarily rely on having access to the original source code in order to identify similarities between programs. Further, such prior art techniques cannot effectively identify similarities in large numbers of different binary programs where large numbers of changes have occurred. An existing tool, the .RTPatch® patch-build program available from Pocket Soft, Inc., Houston, Tex. 77282, is useful in comparing two particular binary files for creating individual program patches for repairing or updating programs. This tool allows for the efficient distribution of only the changes to the program to the eventual end-users but does not appear to be directed to finding similarities in and between large number of binary files.

Therefore, a need exists for a technique which detects similarities between a large number of binary programs, e.g., Java bytecodes, without access to the underlying source code.

SUMMARY OF THE INVENTION

The present invention provides a technique for detecting similarities in large sets of binary code files, e.g., bytecode files, without requiring access or knowledge of the actual source code itself. Further, the invention enables the detection of similarities where there are few common sequences of bytes in the binary code files themselves. In accordance with the invention, binary files are disassembled and preprocessed using encoding to prepare the disassembled binary files for use in conjunction with similarity detection tools. More particularly, encodings of the disassembled binary files transform such files into a form which is less affected by secondary changes resulting in source code changes, so that text-based similarity detection tools can yield useful similarity results from comparing the encoded binary files.

In accordance with the preferred embodiment of the invention, a Java bytecode file is disassembled. After disassembly of the bytecode file, the code of each method (the Java construct which defines object behavior) in the file is extracted. In accordance with the preferred embodiment, a lexical analyzer is applied to the disassembled bytecode for preprocessing such code for execution with similarity detection tools, e.g., Dup. Additional preprocessing of the disassembled bytecode includes using positional encoding to calculate offsets. After preprocessing the disassembled bytecode as described above, the preprocessed bytecode is passed to similarity detection routines, e.g., Dup, Siff and Diff, for determining any similarities between the bytecode files. Advantageously, the preprocessing of the bytecode files using positional encoding improves the ability of the similarity detection tools to detect similarities between a large number of bytecode files.

As mentioned previously, program similarity detection tools are not new. It has, however, remained for the inventors herein to recognize that such similarity detection tools, in particular, the Dup, Siff and Diff tools heretofore useful in source code similarity searching can be adapted to provide an elegant tool for detecting similarities in binary programs without having access or knowledge of the actual source code itself.

BRIEF DESCRIPTION OF THE DRAWINGS

FIG. 3 shows the disassembled bytecode of FIG. 2 after application of positional encoding and calculating offsets in accordance with the principles of the invention;

FIG. 4 shows the results of performing similarity tests on two different Java programs in accordance with the invention;

FIG. 5 shows the results of detecting similarities in a large number of bytecode files, using different combinations of similarity detection tools, in accordance with the invention; and FIG. 6 shows comparison results of detecting similarities in bytecode files using the Diff tool in accordance with the invention.

Throughout this disclosure, unless otherwise noted, like elements, blocks, components or sections in the figures are denoted by the same reference designations.

DETAILED DESCRIPTION

Figure 1:
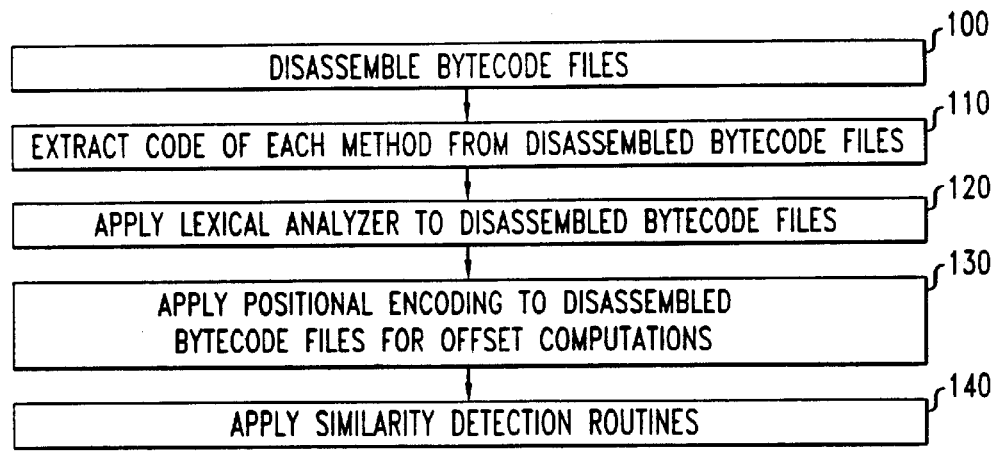
FIG. 1 shows a flow diagram of operations for detecting similarities in bytecode files in accordance with the principles of the invention.

The present invention provides a technique for detecting similarities in large sets of binary code files, e.g., bytecode files, without requiring access or knowledge of the actual source code itself. In accordance with the invention, bytecode files are disassembled and preprocessed using positional encoding to prepare the disassembled bytecode files for use in conjunction with similarity detection tools.

In order to provide context and facilitate an understanding of the invention, a brief overview of the Dup, Siff, and Diff tools will now be presented. It should be noted that the present invention includes notions of preprocessing binary files and adaptations to the aforementioned tools in order to operate on, and detect similarities between, binary files.

Siff, as described in Manber supra, is a program for finding similarities in text files. This tool uses a special kind of random sampling, such that if a sample taken from one file appears in another file it is guaranteed to be taken there too. A set of such samples, which are referred to as "approximate fingerprints" in the Siff context, provides a compact representation of a file. With high probability, sets of fingerprints of two similar files will have a large intersection and the fingerprints of two non-similar files will have a very small intersection. Siff works in two different modes: all-against-all and one-against-all. The all-against-all mode finds all groups of similar files in a large file system and gives an approximate indication of the similarity. The running time is essentially linear in the total size of all files thereby making Siff scalable. The one-against-all mode compares a given file to a preprocessed approximate index of all other files, and determines very quickly all files that are similar to the given file. In both modes, similarity can be detected even if similar portions constitute a small percentage, e.g., 25%, of the size of the smaller file.

As with the aforementioned Siff tool, the Dup tool was originally designed for operating with source or text files, the details of which are described, e.g., in Baker supra. Briefly, Dup looks for similarity of source codes based on finding sufficiently long sections of code that "almost match." As mentioned above, Dup's notion of almost-matching is the parameterized match ("p-match") where two sections of code are a p-match if they are the same textually except possibly for a systematic change of variable names, e.g., if all occurrences of "count" and "fun" in one section are changed to "num" and "foo", respectively, in the other. For a threshold length (in lines) specified by the user, Dup reports all longest p-matches over the threshold length within a list of files or between two lists of files. It can compute the percentage of duplication between two files or the percentage of duplication for the cross-product of two lists of files. Further, Dup can generate a profile that shows the matches involving each line in the input and a plot showing where matches occur. With Dup, a user can choose to base a notion of similarity on the existence of matching sections over a threshold length, on the percentage of common code resulting from these matching sections, or on some combination of the two.

An important feature that enables Dup to identify p-matches is to replace tokens such as identifiers by offsets to remove the identity of the identifier while preserving the distinctness of different identifiers. In particular, the first occurrence of an identifier is replaced by a "0", and each later occurrence of the same identifier is replaced by the number of tokens since the previous one. For example, the expression, $u(x,y)=(x>y)?x:y$; and $v(w,z)=(w>z)$; are both encoded as $0(0,0)=(6>6)?5:5$; because u and v occur in the same positions, as do the pair x and w, and the pair y and z. Further, the numbers 6 and 5 represent the number of tokens, i.e., single symbols in this case, between successive occurrences of the same identifier token. More generally, if max, arg 1, and arg 2 are tokens, the same encoding represents $max(arg1, arg2)=(arg1>arg2)?arg1:arg2;$.

Dup computes longest p-matches via a data structure called a parameterized suffice tree ("p-suffix tree".) The p-suffix tree is a compacted tree that represents offset encodings of suffixes of the token string, but only uses linear space because only the offset encoding of the entire input is stored. At each access to an offset, the previous context is used dynamically to determine whether this is the first use of this parameter within the suffix being processed. The algorithms used for building a p-suffix tree and searching it for duplication are described in detail in Baker supra at pp. 37–39, and Brenda S. Baker, Parameterized Duplication in Strings: Algorithms and An Application to Software Maintenance, *SIAM J. Computing*, 26(5):1343–1362, October 1997, which is hereby incorporated by reference herein for all purposes.

As mentioned previously, Diff is a well-known UNIX utility tool for finding commonality between files. In particular, given two text files, Diff reports a minimal length edit script for the differences between the two files, where edit operations include insertions and deletions. As will be appreciated, many algorithms for minimal edit scripts exist in the art, e.g., a widely recognized version of Diff is the GNU's Not Unix ("GNU") implementation (available from the Free Software Foundation, 59 Temple Place, Suite 330, Boston, Mass. 02111) based on the algorithm described in Eugene W. Myers, An O(ND) Difference Algorithm and Its Variations, Algorithmica, 1:251–266, 1986, which is hereby incorporated by reference for all purposes.

The above-described detection tools, i.e., Siff, Dup, and Diff, are each primarily designed for operating on source or text files. However, we have recognized that certain tables are accessed frequently in Java bytecode files, and that making a slight change to a table, e.g., inserting an element, may cause the absolute values of many indices into the table to change throughout the bytecode file. In accordance with the preferred embodiment of the invention, bytecode files are disassembled and particular parameters are identified which are likely to be affected by such secondary changes. Further, for each type of use of such parameters, e.g., whether the parameters are indices into a particular type of table or according to whether they are jumps, the parameters are encoded with that use. In particular, in accordance with the preferred embodiment, particular parameters are encoded in a so-called "normal form" which takes into account positional values that are less affected by secondary changes that are the absolute values of indices, while other parameters are maintained as absolute values, or in the case of pre-existing offsets (e.g., jumps) they are recomputed to reflect changes in position due to disassembly. Such encoding enables the Siff, Dup, and Diff tools, after further adaptations as discussed below, to detect similarities in bytecode files in accordance with the invention.

The adaptation of these tools and the requisite binary file preprocessing in accordance with the principles of the invention will now be discussed. As will be appreciated, a class file (it will be noted that the terms "class file(s)" and "bytecode file(s)" are used interchangeably herein) is typically obtained by compiling a Java file and is a stream of bytes representing a single class in a form suitable for the well-known Java Virtual Machine. The Java Virtual Machine executes bytecodes and provides Java with certain fundamental capabilities such as object creation and garbage collection. As will be appreciated, class files contain certain information such as a so-called magic number which is encoded in class files that identifies the file as a class file, the minor version number, and the major version number. That is, as will be appreciated, a Java Virtual Machine of a particular major and minor version number may run code of the same major version number and the same or lower minor version number. A typical Java class file also contains a number of so-called tables of structures. As further discussed below, two particular tables, the so-called constant pool table and method table, are particularly useful in accordance with the principles of the invention.

The constant pool table contains information regarding all of the constants used in the class, e.g., strings, integers, fields, and classes. This table plays a particularly important role in Java processing due to the fact that many other parts of the class file contain indices into the constant pool. As is well-known, methods, in the context of the Java programming environment, define the behavior of objects, i.e., what happens when the object is created and the various operations that the object can perform during its lifetime. For each method, a method table is created which contains the code and other information. Such other information includes items such as the number of local variables, exception-handlers, the maximum stack length, indices into the constant pool representing the method type, and optional tables useful in debugging operations.

We have recognized that such constant pool and method tables can be useful in providing a technique for detecting similarities in bytecode files in accordance with the invention and as discussed below. More particularly, encodings of disassembled binary files transform such files into a form which is less affected by secondary changes resulting in source code changes, so that text-based similarity detection tools can yield useful similarity results from comparing the encoded binary files. That is, in accordance with the invention, the encoding of values in the disassembled binary files are different for different classes of uses of values, as determined by particular domain knowledge about which classes of uses are more likely to be affected by secondary changes. In accordance with the invention, for particular classes of uses of values that are more likely to be affected by secondary changes, the dissimilarities resulting from secondary changes are filtered out by using so-called positional encoding as described in greater detail below. In short, positional encoding facilitates, in accordance with the invention, the identification of instances where identical values were reused, without providing the actual value which may possibly have been modified. For other classes of values, the absolute values of parameters are kept because these are features of the various computations occurring in the actual programs. In this way, the underlying similarities can be detected, in accordance with the invention, from the encoded binary files using text-based detection tools as will now be described in detail.

Figure 2:
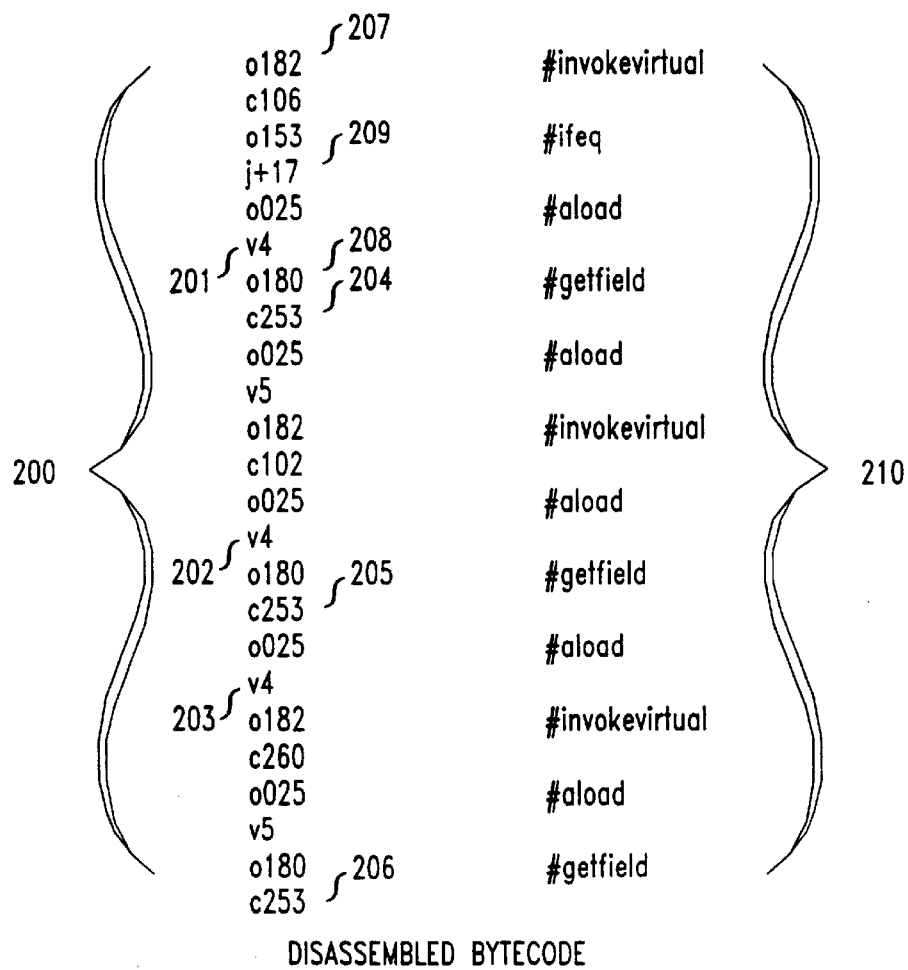
FIG. 2 shows an illustrative section of disassembled bytecode from a randomly selected Java bytecode file.

FIG. 1 shows a flow diagram of operations for detecting similarities in bytecode files in accordance with the principles of the invention. More particularly, in accordance with the preferred embodiment of the invention, a Java bytecode file is disassembled (block 100.) The actual disassembly of such files is well-known and there exist a number of disassemblers which will be readily known by those skilled in the art. In accordance with the preferred embodiment, after disassembly of the bytecode file, the code of each method in the file is extracted (block 110) for further analysis. Such disassembled code contains opcodes and arguments for a sequence of assembly language-level instructions. For example, FIG. 2 shows an illustrative section of disassembled bytecode 200 from a conventional Java bytecode file with comments 210 included to identify the numerical opcodes. As shown, the illustrative section of disassembled bytecode 200 has one opcode or argument per line in recognition that such opcodes can have variable numbers of arguments. A character at the beginning of the each line identifies the type of use of the item on the line. More particularly, opcodes, indices into the constant pool, indices into the local variable table, signed integers, unsigned integers, and jump offsets are identified by the characters "o", "c", "v", "i", "u", and "j", respectively. See, for example, line 207 of disassembled bytecode 200 which contains the instruction "o182" identifying an opcode instruction, or line 209 of disassembled bytecode 200 which contains the instruction "j+17" identifying a jump offset. As will be appreciated, jump offsets are translated from number of bytes in the class file to numbers of lines in the disassembled file.

We have realized that by applying certain preprocessing to disassembled bytecode, e.g., disassembled bytecode 200, from a bytecode file that the Dup, Siff and Diff tools can be effectively utilized to identify similarities in bytecode files. More particularly, in accordance with the preferred embodiment, a lexical analyzer is applied to the disassembled bytecode (see, FIG. 1, block 120) for preprocessing such code for execution with Dup. That is, before applying Dup to bytecode files, it is preferable to "undo" the jump offsets which are already present in the disassembled bytecode thereby changing jumps into a "goto label" form. In this way, Dup will compute the offsets itself for the labels. The dynamic way in which Dup calculates offsets relative of suffixes means that when two otherwise identical sections of code contain jumps to earlier points and the jumps cross insertions or deletions, these jumps will not cause mismatches, as would occur with a precomputed fixed encoding. Advantageously, this lexical preprocessing of the preferred embodiment enables Dup to find longer p-matches.

The lexical analyzer of the preferred embodiment, breaks up the input, i.e., the disassembled bytecode, into two classes of tokens: parameter tokens and non-parameter tokens. Offsets are computed for parameter tokens, e.g. by Dup, but not for non-parameter tokens. Parameter tokens include indices into the constant pool, indices into the local variable table, labels for jumps, and signed and unsigned integers. The non-parameter tokens include opcodes. The various types of parameter tokens are distinguished so that the offsets are computed separately and tokens of different types will not be matched to each other in parameterized matches.

The above-described preprocessing of the disassembled bytecode is directed at the enablement of Dup in detecting similarities in binary files, e.g., bytecodes. We have found that the combination of the Dup, Siff and Diff tools provide significant performance advantages as is discussed further below. However, in order to use the tools in combination certain other preprocessing of the disassembled bytecode is applied, prior to executing Siff and Diff, in accordance with the invention. Such preprocessing is included in the preferred embodiment of the invention in recognition that indices into the constant table or local variable table may change with slight changes to the Java source file, due to additions, deletions, or reorderings of the constant pool and/or local variable table. The further preprocessing allows for identifying contexts in two bytecode files in which different absolute values of indices nevertheless represent similar uses of the indices within the defining contexts, or where occurrences of the same value represent different uses. Differing absolute values of indices may be an indication, for example, that a table element has changed index but that the local computation is the same as before, or that the second program is using a different table value from the first program but in a similar computation. Thus, even though absolute values of table indices in bytecode files may change with slight changes to the Java source, there are still hidden similarities in the bytecode files. In particular, the corresponding uses of indices maintain the same positional relationship. Thus, we have recognized that positional encoding is particularly useful in the further preprocessing of the disassembled bytecode for application of Siff and Diff in combination with Dup to detect similarities.

That is, the encoding of the disassembled bytecode files in accordance with the invention employs positional encoding. Positional encoding (alternatively referred to as offsetting encoding herein) means that at a position where a value is used in the program, the value is replaced by an encoding that depends on whether and where the value was previously used in the programed. If the use is not regarded as a first use, the encoding is a function of the distance from the previous use (within the same context), over a suitable definition of distance. If the value is a first use (within its defining context), the fact that it is a first use is encoded (and possibly the actual value as well, depending upon the application.) The aforementioned Dup tool employs positional encoding wherein each first use is encoded as "0" and each successive use is encoded as a distance from the previous use. This particular positional encoding is described in more detail in U.S. Pat. No. 5,511,159, Method of Identifying Parameterized Matches in a String, issued Apr. 23, 1996, to Brenda S. Baker (a co-applicant in the present application) et al., and U.S. Pat. No. 5,627,748, Method of Identifying Pattern Matches in Parameterized Strings and Square Matrices, issued May 6, 1997, to Brenda S. Baker (a co-applicant in the present application) et al., each of the aforementioned patents (collectively referred to hereinafter as the "Baker Patents") being assigned to the same assignee as the present application, and each of which is hereby incorporated by reference for all purposes.

However, while the use of offset encoding with source code is known (see, the above-mentioned Baker patents), we have recognized that certain attributes of Java bytecode files can be positional encoded as a preprocessing step (see, FIG. 1, block 130) and thereafter similarity detection routines, e.g., Siff, Dup, and Diff, can be applied to determine binary file similarities (see, FIG. 1, block 140.) That is, we have recognized that the positional encoding used in Dup can be modified and extended to facilitate the detection of similarities in binary files. In particular, we realized that if one views an offset, starting at any value, as a pointer from one position to another, a chain can be identified to the first use of that value. Heretofore, in Dup, constants are treated as strings rather than values such that different types of uses are not distinguishable, and each constant has only one chain. However, in accordance with the present invention, a particular value may have multiple chains associated with it because the local context (as determined from domain knowledge about the binary code, e.g., Java bytecode) determines which chain is used for that value. Thus, indices into different tables are distinguished through such context as is further discussed below.

More particularly, in accordance with the invention, each index, contained in the disassembled bytecode, into the constant pool or local variable table is treated as a parameter to be replaced by an offset. Essentially, in the context of disassembled bytecode, the indices into the constant pool or local variable table are treated as so-called "identifiers". These identifiers are fully described in the aforementioned Baker Patents with regard to source code but we have recognized that positionally encoding is particularly advantageous when applied to bytecode in accordance with the principles of the invention. In particular, in accordance with the preferred embodiment of the invention, positionally encoding is executed in a manner in which like parameters contained within a particular disassembled bytecode file are labeled to identify the like parameters positional relationships within the particular disassembled bytecode file. In accordance with the invention, positional encodings are computed as a function of both the actual parameter value and the domain knowledge regarding the class of use of that parameter. Further, the context of an occurrence for a parameter is used to determine the class of use for that occurrence, and the encoding is determined separately for different classes of use. In particular, if a positional encoding is used for a given class, it is computed relative to the previous occurrence of that parameter within the same class of use without regard to occurrences of the same parameter for other classes of use.

In accordance with various embodiments of the invention directed to Java bytecode, domain knowledge about the Java Virtual Machine is informative with respect to whether the program code for a method may contain indices into compiler-generated tables namely the constant pool and the local variable pool, respectively, with a different local variable table for each method. Further, for each method, a different local variable table is assigned where jumps are given relative displacement, i.e., the number of bytes to jump forward or backward from the current instruction, and other types of constants may occur as well. Further, each occurrence of a parameter is classified as to whether it is an index into the constant pool an index into the local variable table for the current method, a jump displacement, or some other class of use. Thus, offset codings are computed independently for the indices into the constant pool and the indices into the local variable pool, while jump displacements are recomputed relative to the same distance measure used for the positional encoding and some classes of constants remain unchanged with application of positional encoding. The selection of which type of encoding to apply for each class is determined by domain knowledge. That is, domain knowledge is useful in determining which indices into the constant pool and local variable pool are more likely to be changed by the compiler as secondary changes when a small change is made elsewhere in the source program. Further, domain knowledge is also useful in determining which other constants are likely to change only when the source code being compiled into that instruction is itself changed.

In accordance with the preferred embodiment, the first occurrence of each index is encoded as "0", and thereafter each use of an index is encoded as the negative of the number of lines since the previous use (if any) of the same index. Offsets for indices into tables are negative in order to be consistent with jump offsets, which are negative for a jump to a preceding line and positive for a jump to a later line. As will be appreciated, in further embodiments of the invention using different executable files, other values can be used for the encodings described above so long as the first use of the particular value is distinguished from the computed offsets used at successive uses. Further, the offsets themselves may be encoded differently, in accordance with the principles of the invention, to realize the advantageous aspects of the invention in detecting similarities in executable file, e.g., binary files. For example, the encoding could generated as positive values rather than negative values, or the use of a value may be encoded using its actual value in addition to some particular marking indicative of a first use.

Figures 3, 4:
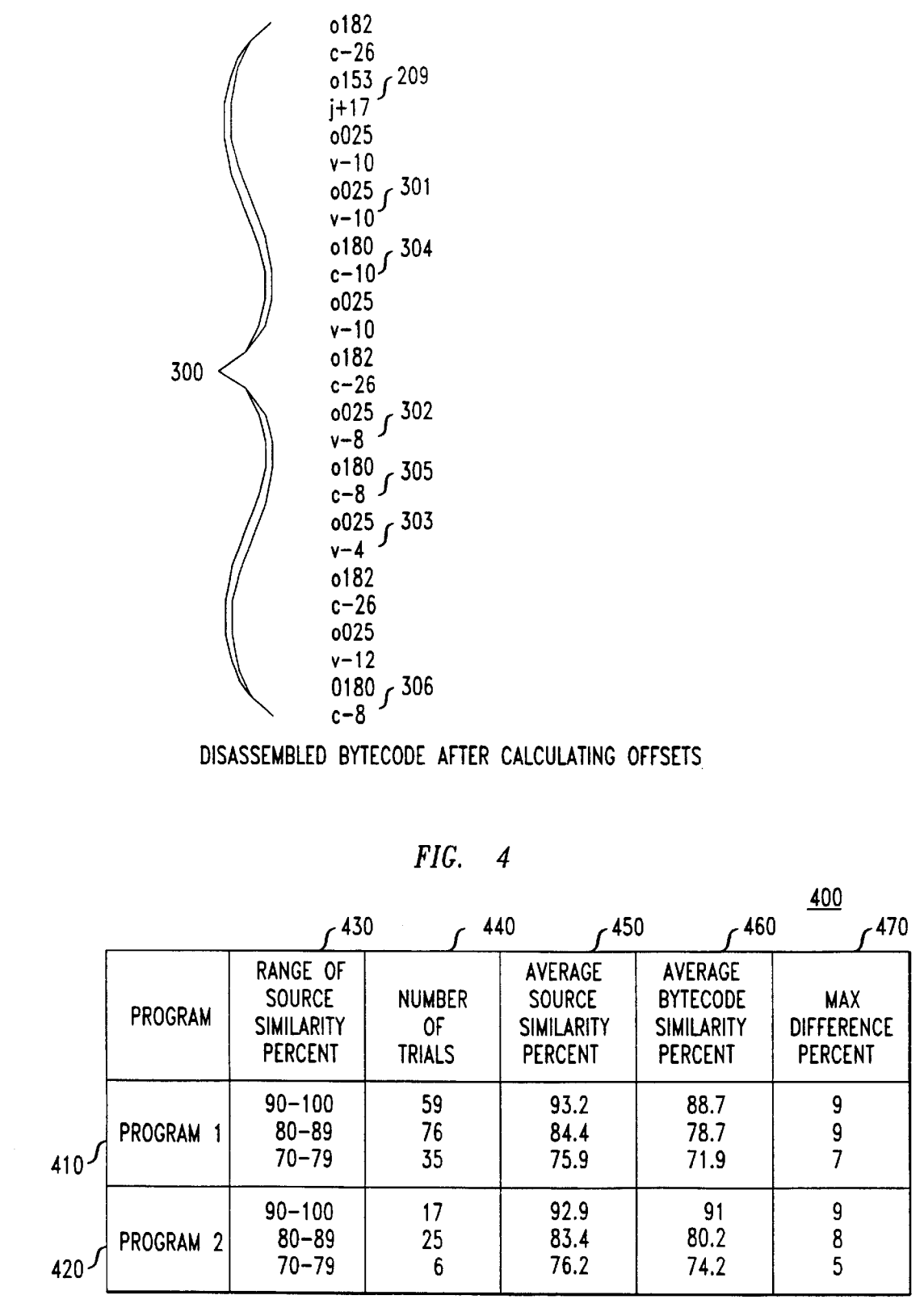

Turning our attention to FIG. 2 and FIG. 3, code section 300 is shown which represents disassembled bytecode 200 with the offsets which result after application of the above-described operations. Illustratively, in FIG. 2, the variable "v4" in lines 201, 202 and 203, respectively, indicates that the "4" is an index into the local variable table for this particular method. Thus, in FIG. 3, each occurrence of the "4" is replaced by the appropriate offset in accordance with the principles of the invention. Illustratively, the offset is "−10", see, line 301 of code section 300, because "v4" occurred 10 lines previously in the disassembled bytecode from which this excerpt was extracted. Similarly, the offset is "−8", see, line 302 of code section 300 because "v4" occurred 8 lines previously in line 201 of the disassembled bytecode, and the offset is "−4", see, line 303 of code section 300 because "v4" occurred 4 lines previously in line 202 of the disassembled bytecode.

Similarly, in accordance with this embodiment of the invention, the "c253" occurring in lines 204, 205, and 206, respectively, represents an index into the constant pool which is replaced after calculating offsets by "−10" in line 304, "−8" in line 305, and "−8" in line 306. Further, it is significant to note that, in the present embodiment, the several occurrences of "o182" and "o180" in disassembled bytecode 200, see, e.g., line 207 and line 208, are not translated into offsets in code section 300. No offsets are computed because the domain knowledge indicates that such values in this class are not likely to be affected by secondary changes due to compilation. Advantageously, this encoding decreases reliance on the absolute value of the indices while preserving the information as to whether indices for different instructions are the same or different. For example, if two files are the same except that indices in one file are always one larger than indices in the other, the encodings of the two files will be identical. Thus, the further preprocessing of the disassembled bytecode via offsets allows for the effective application of the Siff and Diff tools to assist in the detection of binary file similarities in accordance with the principles of the invention.

Finally, as mentioned previously, after completion of the preprocessing of the disassembled bytecode, the bytecode is passed to similarity detection routines (see, FIG. 1, block 140), e.g., Dup, Siff and Diff, for the detection of similarities between the bytecode files.

To further illustrate the advantages of the invention in detecting similarities in binary files, three different illustrative applications of our invention will be discussed. In the first application, one Java source program was used to which many different random changes (over 24 changes total) were made. These changes included the addition of statements, e.g., "newvariable=43", in random places, and substitution/deletion of statements, e.g., changing complex conditions in "if" and "while" statements to "i<1". The number of changes to the Java program were varied along with the ratio between additions and deletions. Thereafter, similarities tests were run on two different Java programs (i.e., two modified programs from the original source) with the results 400 shown in FIG. 4. In particular, the similarity results for "program 1" 410 and "program 2" 420 are shown in terms of the range of source similarity percent 430, number of trials 440, average source similarity percent 450, average bytecode similarity percent 460, and maximum difference percent 470 between source and bytecode similarity. As seen from results 400, the bytecode similarities detected in accordance with the principles of the invention are close to the source code similarities. Advantageously, because the degree of similarity tends to be close for pairs of bytecode files and their source files, it is possible, in accordance with the invention, to predict from a pair of bytecode files whether their source files are similar.

In the second illustrative application of our binary file similarity detection technique, a larger set of 2056 Java bytecode files (generated from a collection of 38 different randomly selected source files) were used to look for similar files from different collections. In the context of this second application, the similarity between two files is defined as the percentage of one file that is contained in the other. Thus, similarity here is an asymmetric relation, e.g., if file A is contained in another file B twice its size, then file A is 100% similar to file B, but file B is 50% similar to file A. In this embodiment, to avoid ambiguity, we express similarity in terms of ordered pairs so that the former case is described as 100% similarity for (A,B) and the latter case is described as 50% similarity for (B,A). After applying the similarity detection technique in accordance with the principles of the invention, Siff reported 634 ordered pairs of files with similarities of at least 50%. Of the 634 pairs, 591 were between files in the same collection, and 43 were between files in different collections.

Next, Dup was applied to aid in analyzing which of these similar pairs represent particularly important or usefull relationships. For the same 2056 Java bytecode files, Dup reported 92 ordered pairs of files having at least one common code section of 200 lines or more, in comparison to the 634 ordered pairs reported by Siff. FIG. 5 shows the results 500, from this second application, broken down by how many ordered pairs 510 were reported by Siff alone 540, by both Siff and Dup 550, and by Dup alone 560. Additionally, we show similarity results broken down by ordered pairs with different collections 520, and unordered pairs with different collections 530.

The results derived from the above-described applications indicate that our binary file similarity detection invention effectively discovers similarities between binary files. Further, the above-described results also show a minimal rate of so-called false positives in the similarity detection. The third illustrative application, in addition to continuing to show the effectiveness of our invention, addresses the issue of so-called false negatives, i.e., how many similar pairs were not detected. As will be appreciated, there is no one guaranteed approach for the measurement of false negatives. In this third application, we had 12 programs randomly selected from a set of 765 Java source programs. The selected programs were randomly changed (e.g., additions or deletions), compiled, and provided as input to the Siff and Dup tools in accordance with the principles of the invention. Using a similarity threshold of 65% with Siff, 9 programs out of the 12 were found to be similar to the originals. Dup, with a similarity threshold of 100 common lines, detected 8 out of 12. In combination, the two tools detected similarities in 10 of 12 programs.

To further illustrate the advantageous features of the invention, the Diff tool was applied to the disassembled bytecode in the third application in two ways: (1) in accordance with the principles of the invention; and (2) without use of the invention. The results 600 of this further illustrative test are shown in FIG. 6. The pairs 610 varied in file size and how many changes were made. In order to obtain a relatively size-invariant measure, the length of the Diff output (in lines) is divided by the sum of the file sizes, for each file type as shown in results section 620. In particular, "Java" column 690 shows the relation "d/j", where d is the size of the Diff output for the Java source files and j is the sum of the sizes of the Java source files. Further, "offset" column 630 shows the same relation where d is the size of the Diff output for the offset-encoded files, in accordance with the invention, and j is the sum of the sizes of the offset-encoded files. Similarly, "no offset" column 640 shows the same relation where d is the size of the Diff output for disassembled files without the offset encoding of the invention, and j is the sum of the sizes of these files. Thus, the percentages shown in results section 620 may be interpreted as a size-invariant measure of similarity of the Java source files that can be compared with the corresponding percentages of similarity for the corresponding bytecode files. A second results measure is the average length of blocks of identical lines reported by Diff as shown in results section 650. As before, those results obtained in accordance with the principles of the invention are shown under "offset" column 660 and without the inventive technique under "no offset" column 670. Results section 680 contains the sum of the sizes of the offset-encoded disassembled files, which is the same as the sum of the file sizes without offset-encoding, thereby indicating the range of file sizes tested. As can be seen from results 600 in FIG. 6, a significant improvement is obtained when employing the principles of the invention in conjunction with Diff to detect binary file similarities.

The present invention can be embodied in the form of methods and apparatuses for practicing those methods. The invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The invention can also be embodied in the form of program code, for example, in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

The foregoing merely illustrates the principles of the present invention. Therefore, the invention in its broader aspects is not limited to the specific details shown and described herein. Those skilled in the art will be able to devise numerous arrangements which, although not explicitly shown or described herein, embody those principles and are within their spirit and scope.

We claim:

1. A method of detecting similarities between a plurality of bytecode files, the method comprising:

disassembling each bytecode file of the plurality of bytecode files to form a plurality of disassembled bytecode files;

applying a lexical analyzer to at least one disassembled bytecode file, the applying the lexical analyzer operation further comprising:

separating at least one disassembled bytecode file into a plurality of parameter tokens and a plurality of non-parameter tokens; and computing a offset for at least one parameter token of the plurality of parameter tokens;

positionally encoding each disassembled bytecode file of the plurality of disassembled bytecode files; and detecting similarities between particular ones of the bytecode files as a function of a comparison between the encoded disassembled bytecode files.

2. The method of claim 1 wherein at least one parameter token includes a index into a constant pool associated with the disassembled bytecode file, and at least one non-parameter token includes a opcode instruction from the disassembled bytecode file.

3. A method of detecting similarities between a plurality of bytecode files, the method comprising:

disassembling each bytecode file of the plurality of bytecode files to form a plurality of disassembled bytecode files, wherein each disassembled bytecode file includes a plurality of indexes, at least one index of the plurality of indexes being linked with a constant pool, and at least another one index of the plurality of indexes being linked with a local variable table;

applying a lexical analyzer to at least one disassembled bytecode file;

positionally encoding each disassembled bytecode file of the plurality of disassembled bytecode files; and detecting similarities between particular ones of the bytecode files as a function of a comparison between the encoded disassembled bytecode files.

4. The method of claim 3 wherein the positionally encoding each disassembled bytecode file operation computes a first offset for the index linked with the constant pool and a second offset for the another one index linked with the local variable pool.

5. The method of claim 4 wherein the first offset is a number of program code lines in the disassembled bytecode file.

6. The method of claim 3 further comprising:

identifying a source program from which at least one of the particular ones of the bytecode files originates.

7. The method of claim 6 wherein the comparison is made by executing a combination of Siff, Dup and Diff detection tools.

8. The method of claim 6 wherein the source program is a Java applet.

9. A machine-readable medium having stored thereon a plurality of instructions, the plurality of instructions including instructions that, when executed by a machine, cause the machine to perform a method of detecting similarities between a plurality of bytecode files by disassembling each bytecode file of the plurality of bytecode files to form a plurality of disassembled bytecode files, applying a lexical analyzer to at least one disassembled bytecode file, positionally encoding each disassembled bytecode file of the plurality of disassembled bytecode files, and detecting similarities between particular ones of the bytecode files as a function of a comparison between the encoded disassembled bytecode files, wherein the positionally encoding is performed in a manner in which like parameters contained within a particular disassembled bytecode file are labeled to identify the like parameters' positional relationships within the particular disassembled bytecode file, and wherein each disassembled bytecode file includes a plurality of indexes, at least one index of the plurality of indexes being linked with a constant pool, and at least another one index of the plurality of indexes being linked with a local variable table.

10. The machine-readable medium of claim 9 wherein the positionally encoding each disassembled bytecode file operation computes a first offset for the index linked with the constant pool and a second offset for the another one index linked with the local variable pool.

11. An apparatus for detecting similarities in a plurality of binary code files, the apparatus comprising:

means for disassembling each binary code file of the plurality of binary code files to form a plurality of disassembled binary code files, wherein each disassembled binary code file includes a plurality of indexes, at least one index of the plurality of indexes being linked with a constant pool, and at least another one index of the plurality of indexes being linked with a local variable table;

means for positionally encoding particular ones of the disassembled binary code files; and means for detecting similarities between particular ones of the binary code files as a function of a comparison between the encoded disassembled binary code files.

12. The apparatus of claim 11 wherein the means for positionally encoding performs the encoding in a manner in which like parameters contained within a particular disassembled bytecode file are labeled to identify the like parameters' positional relationships within the particular disassembled bytecode file.

13. The apparatus of claim 12 further comprising:

means for recording the particular ones of the binary code files for which similarities are detected; and means for identifying a source program from which at least one of the particular ones of the binary code files originates.

14. The apparatus of claim 11 wherein the means for detecting similarities employs at least one similarity detection tool.

15. The apparatus of claim 14 wherein the similarity detection tool is a similarity detection tool selected from the group consisting of Siff, Dup and Diff.

* * * * *